United States

Itoh

[11] 3,819,253
[45] June 25, 1974

[54] TELEPHOTO LENS SYSTEM

[75] Inventor: Keiichi Itoh, Tokyo, Japan

[73] Assignee: Olympus Optical Co., Ltd., Tokyo-to, Japan

[22] Filed: May 11, 1973

[21] Appl. No.: 359,537

[30] Foreign Application Priority Data
May 15, 1972 Japan.................. 47-47166

[52] U.S. Cl.................... 350/220, 350/177
[51] Int. Cl..................... G02b 9/24, G02b 13/02
[58] Field of Search................ 350/220, 177

[56] References Cited
UNITED STATES PATENTS
2,458,836  1/1949  Cox................... 350/220

*Primary Examiner*—John K. Corbin
*Attorney, Agent, or Firm*—Cushman, Darby & Cushman

[57] ABSTRACT

A compact telephoto lens system having powers of the front and rear lens groups adequately balanced, small telephoto ratio and favourably corrected aberrations.

1 Claim, 5 Drawing Figures

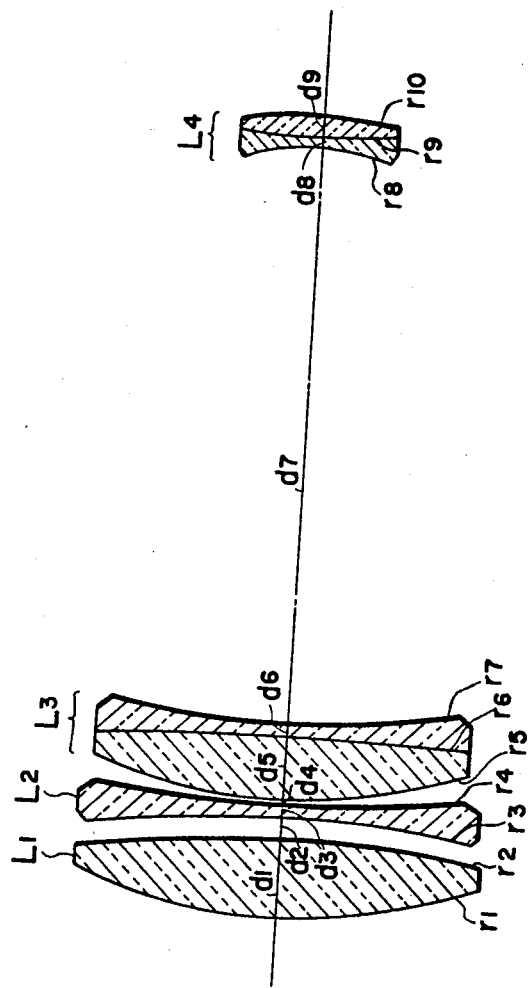

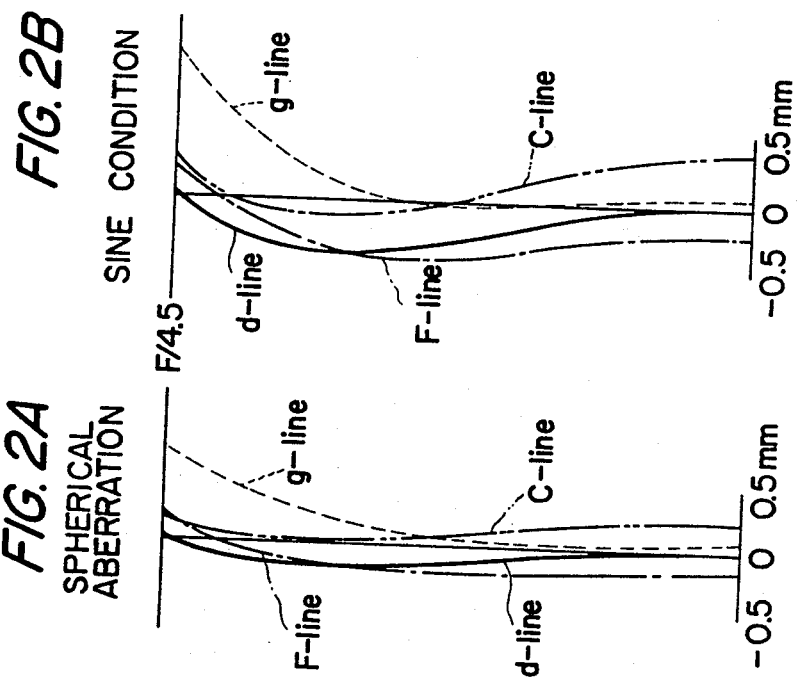

TELEPHOTO LENS SYSTEM

BACKGROUND OF THE INVENTION a. Field of the Invention

The present invention relates to a photographic lens system and, more particularly, to a very compact telephoto lens system with a telephoto ratio (a value obtained by dividing the distance from the first lens surface of the lens system to the back focus by the total focal length of the whole lens system) within 0.8.

b. Description of the Prior Art

For a telephoto lens, a smaller telephoto ratio is more desirable as it is more convenient for handling. To make the telephoto ratio smaller, however, IT IS NECESSARY TO MAKE THE POWER OF THE FRONT LENS GROUP A POSITIVE VALUE OF A LARGE ABSOLUTE VALUE AND TO MABE THE POWER OF THE REAR LENS GROUP A NEGATIVE VALUE OF A LARGE ABSOLUTE VALUE. As a result, combination of powers in the lens system as a whole is unbalanced and it becomes considerably difficlut to correct aberrations favourably. Especially, Petzval's sum becomes large and the secondary spectrum in chromatic aberation increases. Therefore, telephoto ratio of most of conventional telephoto lenses is from 0.85 to 0.9.

SUMMARY OF THE INVENTION

It is, therefore, the principal object of the present invention to provide a compact telephoto lens system with a telephoto ratio within 0.8 for which aberrations are favourably corrected, especially, Petzval's sum is satisfactorily small and chromatic aberration is quite favourably corrected.

In the present invention, a compact telephoto lens system with favourably corrected aberrations is achieved by combining powers of the front and rear lens groups very skillfully and, at the same time, selecting the optical glass adequately.

BRIEF DESCRIPTION OF THE DRAWINGS

FIG. 1 shows a sectional view of an embodiment of the telephoto lens system according to the present invention; and FIGS. 2A–2D show graphs illustrating aberrations of said embodiment of the telephoto lens system.

DETAILED DESCRIPTION OF THE PREFERRED EMBODIMENT

As shown in FIG. 1, the telephoto lens system according to the present invention comprises two lens groups i.e., the front lens group and rear lens group. The front lens group comprises three components, i.e., the first, second and third components. The first component $L_1$ is a biconvex lens, the second component $L_2$ is a biconcave lens and the third component $L_3$ is a cemented positive meniscus component. The rear lens group comprises the fourth component $L_4$ which is a cemented negative meniscus component arranged with a large airspace from the front lens group. Numerical data of the telephoto lens system according to the present invention are as given below.

F 1:4.5  $f=300$

| | | |
|---|---|---|
| $r_1=89.944$ | | |
| | $d_1=13$ | $n_1=1.48749$ | $\nu_1=70.1$ |
| $r_2=-240.523$ | | |
| | $d_2=4$ | | |
| $r_3=-234.162$ | | |
| | $d_3=3$ | $n_2=1.69350$ | $\nu_2=53.3$ |
| $r_4=427.76$ | | |
| | $d_4=0.1$ | | |
| $r_5=95.45$ | | |
| | $d_5=11$ | $n_3=1.61800$ | $\nu_3=63.4$ |
| $r_6=-613.827$ | | |
| | $d_6=3$ | $n_4=1.73980$ | $\nu_4=31.7$ |
| $r_7=184.817$ | | |
| | $d_7=100$ | | |
| $r_8=-41.868$ | | |
| | $d_8=2$ | $n_5=1.71300$ | $\nu_5=54.0$ |
| $r_9=126.591$ | | |
| | $d_9=4$ | $n_6=1.59270$ | $\nu_6=35.6$ |
| $r_{10}=-57.411$ | | | wherein reference symbols $r_1$ through $r_{10}$ represent radii of curvature of respective lens surfaces, reference symbols $d_1$ through $d_9$ represent thicknesses of respective lenses and spaces between lenses, reference symbols $n_1$ through $n_6$ represent refractive indexes of respective lenses and reference symbols $\nu_1$ through $\nu_6$ represent Abbe's number of respective lenses.

For the lens system according to the present invention having the above mentioned numerical data, an abnormal dispersion glass of KzSF type with the refractive index 1.7398 and Abbe's number 31.7 is adapted for the concave lens on the image side of the third component $L_3$, which is a cemented positive meniscus component. Besides, increase of Petzval's sum in the front lens group is reduced by making the airspace $d_2$ between the first component $L_1$ and second component $L_2$ small. Thus, Petzval's sum of the lens system as a whole is made small. The abovementioned concave lens on the image side of the third component $L_3$ also serves to minimize chromatic aberration. Besides, spherical aberration for every wavelength is also satisfactorily corrected by making the airspace $d_2$ between the first component $L_1$ and second component $L_2$ small as described in the above.

FIGS. 2A–2D curves illustrating spherical aberration, sine condition, astigmatism and distortion of the telephoto lens system according to the present invention as described above. As it is evident from the above, the telephoto lens system according to the present invention has aberrations corrected favourably. Especially, chromatic aberration is corrected quite favourably and Petzval's sum is extremely small. Besides, the lens system according to the present invention is a very compact telephoto lens system with a telephoto ratio within 0.8.

I claim:

1. A telephoto lens system comprising a front lens group consisting of three components, i.e., a first component, second component and third component said first component being a biconvex lens, said second component being a biconcave lens, and said third component being a cemented positive meniscus component, and a rear lens group consisting of a fourth component, said fourth component being a cemented netative meniscus component, and said telephoto lens system having the following numerical data:

F 1:4.5  $f=300$

| | | | |
|---|---|---|---|
| $r_1=89.944$ | | | |
| | $d_1=1,48749$ | $n_1=1,48749$ | $\nu_1=70.1$ |
| $r_2=-240.523$ | | | |
| | $d_2=4$ | | |

-Continued $r_3 = -234.162$    $d_3 = 3$    $n_2 = 1.69350$    $\nu_2 = 53.3$
$r_4 = 427.76$    $d_4 = 0.1$
$r_5 = 95.45$    $d_5 = 11$    $n_3 = 1.61800$    $\nu_3 = 63.4$
$r_6 = -613.827$    $d_6 = 3$    $n_4 = 1.73980$    $\nu_4 = 31.7$
$r_7 = 184.817$    $d_7 = 100$
$r_8 = -41.868$    $d_8 = 2$    $n_5 = 1.71300$    $\nu_5 = 54.0$
$r_9 = 126.591$ $r_{10} = -57.411$    $d_9 = 4$    $n_6 = 1.59270$    $\nu_6 = 35.6$ wherein reference symbols $r_1$ through $r_{10}$ represent radii of curvature of respective lens surfaces, reference symbols $d_1$ through $d_9$ represent thicknesses of respective lenses and spaces between lenses, reference symbols $n_1$ through $n_6$ represent refractive indexes of respective lenses and reference symbols $\nu_1$ through $\nu_6$ represent Abbe's number of respective lenses.

* * * * *